3,714,388
DUAL SCREEN REMOTE CONTROLLER
Richard Ernest Evans, 35 Shady Vista Road,
Rolling Hills Estates, Calif. 90274
Filed Dec. 2, 1971, Ser. No. 204,562
Int. Cl. H01h 9/02
U.S. Cl. 200—168 R                   4 Claims

ABSTRACT OF THE DISCLOSURE

A plurality of thumb actuated switches can be positionally arranged on a hand held control box to provide both independent and simultaneous operation of the left and right hand elements of a dual screen projection system. Additionally, the control box is provided with a plastic finger grip and telescoping pointer.

BACKGROUND OF THE INVENTION

The effective presentation of technical proposals can be enhanced by using several audio-visual display devices in combination. For example, if it is desired to show certain economic aspects in the form of bar graphs, or if artistic renderings are necessary to illustrate certain features, a single slide projector can be used. Then, at a later time a movie projector might be used to show certain action items, or it may be effective to use two slide projectors in a dual screen fashion, with one frame headlining certain features which are shown by a series of photographs on the other slide projector. Or, the operator may wish to show a movie on one screen and a series of slides on an adjacent screen; or to back up or stop the movies on a single frame, and at any time start and stop tape-recorded audio signals. It is thus conceivable that an effective presentation could use several different audio and visual combinations at various times. The effectiveness, of course, will depend upon the ease and convenience by which the operator can carry out the various switching operations at a remote location. He may, for example, wish to walk about, narrate and use a pointer as the presentation progresses—while at the same time gesticulate with one of both hands. What is actually desired is a convenient means for remotely controlling a variety of visual, audio-visual, and/or audio devices.

Accordingly, a primary object of the present invention is to provide a hand held remote control switch box for controlling a plurality of visual display devices.

Another object of the present invention is to provide a hand held remote control switch box having an extendable pointer.

A further object of the present invention is to provide a control box having shape and switch positions that enable the operator to hold and operate it with one hand without visual reference.

Other objects and advantages of the present invention will be obvious from the detailed description of a preferred embodiment given herein below.

SUMMARY OF THE INVENTION

The aforementioned objects can be realized by the present invention which comprises a remote control box having a plastic finger grip and extendable telescoping pointer. The box has eight switches arranged in two columns of four each and a ninth switch not associated with either row. The two rows are slightly off center with respect to the geometric center of the control box to facilitate thumb control access. The left row is used to control equipment associated with the left screen of a dual screen projection system and the right row is used to control equipment associated with the right hand screen. The ninth switch is used to simultaneously change the left and right hand slide projectors. Other switches can be added or one of the nine switches could be used to run a tape recorder rather than projection equipment.

DESCRIPTION OF THE DRAWINGS

FIG. 1 shows a schematic diagram of the switches.
FIG. 2 is a perspective view showing the physical location of the switches.

DETAILED DESCRIPTION OF A PREFERRED EMBODIMENT

Advertising to the drawings, and particularly FIG. 2, a preferred embodiment of the invention comprises a hand control box having nine switches (A–I) as shown. On the underside of the box is a channeled plastic finger grip (labeled N). An extendable telescoping pointer M is attached to the front end of the box, and the cord L, which carries the electrical signals, enters the rear end of the box. Eight of the switches (B–I) are slightly left of center to facilitate actuation with the right thumb. Switch A is located in the upper right corner and is also accessible with the right thumb.

Referring now to FIG. 1, lines 1 and 5 are energized with an alternating current voltage from the right and left hand slide projectors respectively. Switch A is a pushbutton momentary contact, single throw, double pole switch for operating both the left and right hand slide projectors simultaneously. When switch A is depressed, lines 1 and 2 are shorted together and lines 5 and 6 are shorted together thus causing both slides of a dual screen arrangement to change simultaneously.

Siwtch B is a momentary contact, pushbotton, single throw, single pole switch for changing the slides of the left screen slide projector. When switch B is depressed only lines 5 and 6 are shorted together.

Switch C is a momentary contact, pushbutton, single throw, single pole switch for changing slides in the right screen slide projector. When switch C is depressed only lines 1 and 2 are shorted together.

Switch D is a momentary contact, single throw, single pole switch for reversing the left hand slide projector. When switch D is actuated it shorts lines 5 and 7 together causing a latching relay in the projector to change state. Subsequent actuation of switch B will cause the left hand projector to show previously viewed slides. To proceed forward again, switch D can be depressed once more causing the latching relay to return to its original state.

Switch E is a momentary contact, single throw, single pole switch for reversing the right projector in the same manner that switch D reverses the left projector.

Switch F is a latching pushbutton switch which starts and runs the left screen motion-picture projector.

Switch G is a latching pushbutton switch which starts and runs the right screen motion picture projector.

Switch H is a double throw, double pole, toggle switch for focusing the left hand slide projector. Diode J blocks one polarity of the applied A–C voltage on line 5 to provide a positive D.C. output on line 8 when switch H is thrown to the left (FIG. 1) and negative D.C. voltage on line 8 when switch H is thrown to the right. As a consequence, the D.C. focusing motor in the left screen slide projector is driven either left or right depending upon the position of remote switch H.

Switch I and diode K operate in a like manner to provide a positive or negative voltage on line 4 to focus the right hand slide projector as a consequence of the A-C signal applied to line 1.

From the foregoing description, it will be evident that the operator can independently control two slide projectors (forward, back, and remote focus) and also stop and start two motion picture projectors. The physical relationship of the switches enable all of this to be done with one hand and without changing the position of the hand—each switch being readily accessible to the right thumb when the unit is held in the right hand. The telescoping pointer can be extended from time-to-time as required—the operator can otherwise keep his left hand free for suitable gesticulation in aid of the presentation.

The basic concept of the invention may, of course, be extended to other equipment such as tape recorders, or TV projectors, for example. This can be done by adding additional switches—or some of the existing switches can be used for this purpose. Thus, either switch F or G could be used to stop and start a tape recorder (or other audio reproducing device) instead of a motion picture projector. It will thus be evident that the system is highly flexible. It allows the operator to control a complex multi-screen, multi-media presentation—yet leaves him free to respond to audience commentary or questions in that he can reverse the slides or stop a tape recorder or movie. Nor is the invention limited to the particular combination of switches, or their physical location, the particular embodiment being one chosen for exemplary purposes only. Thus, although a preferred embodiment has been shown and described, it will be understood that the invention is not limited thereto, and that numerous changes, modifications, and substitutions may be made without departing from the spirit of the invention.

I claim:

1. A dual screen remote control mechanism for actuating slide and motion picture projectors comprising:
   a control box;
   a plurality of switches for actuating left screen projection equipment;
   a plurality of switches for actuating right screen projection equipment;
   wherein said plurality of switches for operating the left screen projection equipment comprises; a switch for changing the slides of a left screen slide projector; a switch for reversing the left screen slide projector; a switch for running a left screen motion picture projector; and
   wherein said plurality of switches for operating the right screen projection equipment comprises; a switch for changing the slides of a right screen slide projector; a switch for reversing the right screen slide projector; and a switch for running a right screen motion picture projector; and including a switch for running an audio reproducing device;
   means for focusing the left screen slide projector from the control box;
   means for focusing the right screen side projector from the control box;
   a switch for changing the slides in both the left and right screen slide projectors simultaneously; and
   a telescoping pointer attached to said control box.

2. The mechanism recited in claim 1 wherein is included:
   a finger grip attached to the underside of said control box, and
   an arrangement of the switches on the upper surface of the control box which permits easy grasping of the control between the fingers and thumb.

3. The mechanism recited in claim 2 wherein:
   all of said switches associated with the left screen projection equipment are grouped together and all of the switches associated with the right screen projection equipment are grouped together, and wherein the pairs of switches associated with the forward slide action, reverse slide action, and movie or tape on-off action are of different shapes, whereby an operator can identify the left and right screen switches by feel, shape and location.

4. The mechanism recited in claim 3 wherein:
   said switch for actuating both slide projectors simultaneously is physically positioned apart from the group of switches associated with the separate control of the left screen equipment and the group of switches associated with the separate control of the right screen equipment.

References Cited
UNITED STATES PATENTS

| | | | |
|---|---|---|---|
| 3,634,655 | 1/1972 | Jordon | 200—51 LM |
| 3,229,053 | 1/1966 | Smith | 200—5 A X |
| 3,139,793 | 7/1964 | Bradford et al. | 200—5 R X |

H. O. JONES, Primary Examiner

U.S. Cl. X.R.

200—5 A